(No Model.)
P. T. GATES.
VEGETABLE PARER AND CORER.
No. 440,705. Patented Nov. 18, 1890.
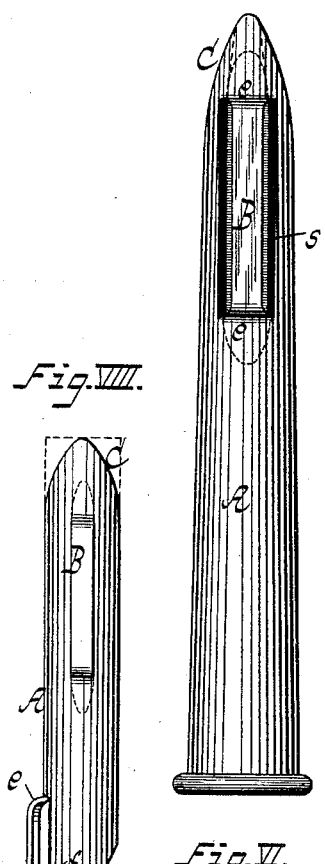
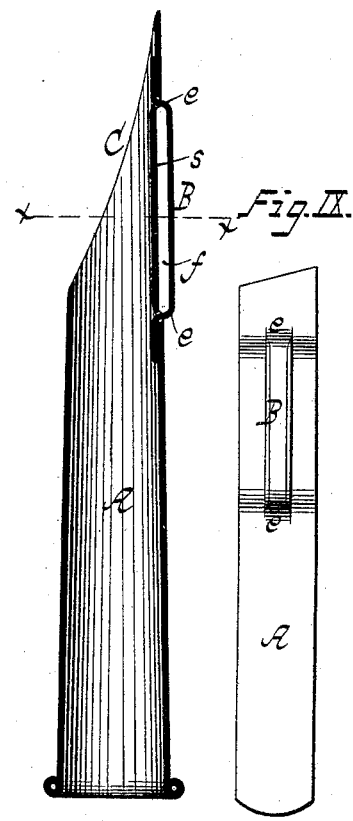
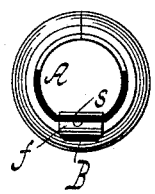
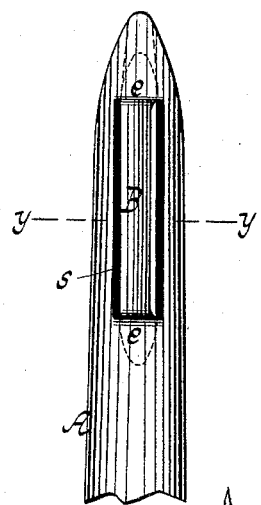
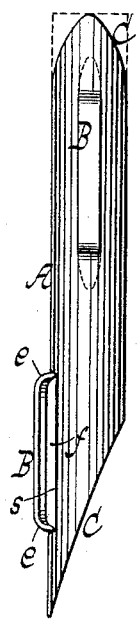
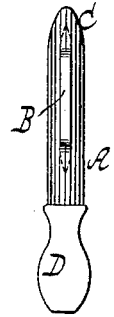
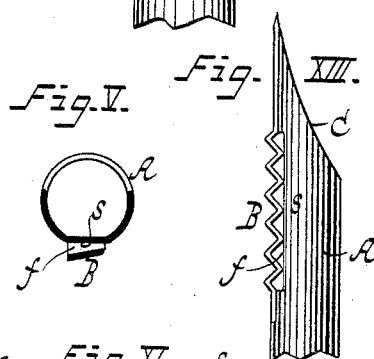
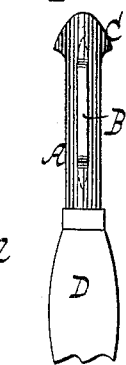
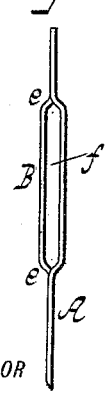
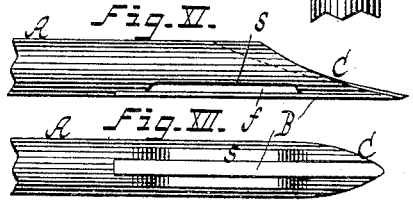
WITNESSES:
Jas. P. Ewbank
John Boyd
INVENTOR
P. Tenney Gates
BY
Francis C. Bowen
ATTORNEY.

UNITED STATES PATENT OFFICE.

PHILEMON TENNEY GATES, OF NEW YORK, N. Y., ASSIGNOR TO FRANK W. GATES, OF SAME PLACE.

VEGETABLE PARER AND CORER.

SPECIFICATION forming part of Letters Patent No. 440,705, dated November 18, 1890.

Application filed January 28, 1890. Serial No. 338,361. (No model.)

*To all whom it may concern:*

Be it known that I, PHILEMON TENNEY GATES, a citizen of the United States, and a resident of New York, in the county of New York and State of New York, have invented certain new and useful Improvements in Vegetable Parers and Corers, of which the following is a specification.

My invention relates to implements for paring or slicing and coring fruits or vegetables by hand; and it consists in certain novel features of construction, hereinafter fully described and claimed, whereby the paring and coring devices are rendered independent of each other to permit effective operation thereof without danger of clogging the core-escape way by the cut paring, or vice versa.

In the accompanying drawings, Figure I represents a side view of a parer and corer embodying my invention. Fig. II represents a longitudinal section thereof. Fig. III represents a cross-section thereof on the line $xx$, Fig. II. Fig. IV represents a side view of a modification thereof. Fig. V represents a cross-section thereof on the line $yy$, Fig. IV. Figs. VI, VII, VIII, and IX are side views of other modifications thereof. Fig. X represents an edge view of the implement shown in Fig. IX. Figs. XI, XII, and XIII represent side views of another modification of my invention.

Similar letters indicate similar parts.

The letter A indicates a stock, and B a flat knife-blade composing the combined parer and corer.

Referring to Figs. I to VII, inclusive, and XI, XII, and XIII, the stock A is of tubular form, and is cut obliquely at one end (marked C) for imparting to such end a scoop-like shape, whereby it is adapted to be used for coring or analogous purposes, the core or cores cut thereby usually escaping through the stock, to facilitate which the stock may be tapered, as shown in Figs. I, II, and IV.

Referring to Fig. VIII, the stock A, also, is of tubular form and is cut obliquely at both ends C C, or it may be left straight at one end, as indicated by dotted lines, while two knife-blades B B are used—one near each end of the stock—to form a double parer and corer, the parts being arranged at right angles to each other.

In either example of my invention, except that shown in Figs. XI, XII, and XIII, the blade B is bent in like directions at its opposite ends $e$ $e$, and is joined to the stock A at those points, so that the shank of said blade, which is left straight, is brought in a raised position and substantially parallel to the stock, leaving a free space or opening $f$ of oblong shape between it and the face of the stock for the escape of the paring that may be cut by the blade, and when the stock is of a tubular form it is flattened at that part thereof opposite the blade to form a transverse recess $s$, which serves to increase the area of said paring-escape opening. When the blade is raised, as above stated, said recess $s$, however, may be of sufficient depth to entirely form the desired opening $f$, using an entirely flat blade B, as shown in Figs. XI and XII, whether the stock A is tubular or solid.

It will be seen that by the opening $f$ the blade B is adapted to be presented to the desired fruit or vegetable by either of its longitudinal edges for paring the article, using the stock A as a handle, while all the paring cut thereby is kept upon the face of the stock without passing into or through it, with the effect of rendering the parer and corer entirely independent of each other in operation, another effect being to permit of controlling the direction in which the paring may escape from the tool for its reception in a suitable holder.

Both edges of the blade B may be sharpened, as shown in Figs. I and III, for adapting it to a right or left handed person, or only one edge thereof may be sharpened, and in that event the blade may be inclined transversely, as shown in Figs. IV and V.

In carrying out my invention the blade B may be formed separate from the stock A, as of a strip of sheet-steel, and soldered or otherwise joined thereto, as more clearly shown in Figs. II and XI, said strip intersecting the recess $s$ and one end thereof being usually extended to a point near the extremity of the corer C for re-enforcing the latter, or the blade may be formed in one piece with the stock, as in Figs. IX and X, which represent the stock as being made flat.

In Figs. VI and VII, I have shown the stock A as applied to a handle D, which may be of any suitable form, and in Fig. XIII, I have shown a blade B with a corrugated portion.

What I claim as new, and desire to secure by Letters Patent, is—

1. A vegetable parer and corer composed of a tubular stock, one end of which is cut obliquely to form the corer, and a knife-blade forming the parer, the ends of which blade are bent in like directions and joined to said stock, substantially as and for the purpose described.

2. A vegetable parer and corer composed of a tubular stock, one end of which is cut obliquely and a part of which is flattened, and a knife-blade opposite said flattened part of the stock, the ends of which blade are bent in like directions and joined to the stock, substantially as and for the purpose described.

3. A vegetable parer composed of a stock, with a transverse recess sunken in the face thereof and a knife-blade arranged on said face of the stock to intersect said recess, with the ends of the blade joined to the stock, forming an opening between the blade and the bottom of the recess, substantially as and for the purpose described.

P. TENNEY GATES.

Witnesses:
FRANCIS C. BOWEN,
JULIA P. GILLICK.